United States Patent [19]
Vijayaraghavan et al.

[11] Patent Number: 5,998,555
[45] Date of Patent: *Dec. 7, 1999

[54] CHARGE TRANSFER POLYMERIZATION PROCESS FOR OBTAINING LOW MOLECULAR WEIGHT POLYMERS HAVING HIGH YIELDS

[75] Inventors: Ranganathan Vijayaraghavan; Sripada Panduranga Rao; Mahadevan Surianarayanan, all of Madras; Kondapuram Vijayaraghavan, Hyderabad, all of India

[73] Assignee: Council of Scientific & Industrial Research, New Delhi, India

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,403

[22] Filed: Nov. 17, 1995

[30] Foreign Application Priority Data

Aug. 4, 1995 [IN] India ............... 1455/DEL/95

[51] Int. Cl.$^6$ ............... C08F 2/06; C08K 5/08
[52] U.S. Cl. ............... 526/204; 526/206; 526/217; 526/219.3; 526/222
[58] Field of Search ............... 526/89, 204, 206, 526/209, 217, 219.3, 220, 222; 525/309

[56] References Cited

U.S. PATENT DOCUMENTS

| | | | |
|---|---|---|---|
| 3,019,215 | 1/1962 | Kroeper | 526/206 |
| 3,888,830 | 6/1975 | Ogasawara . | |
| 4,413,108 | 11/1983 | Janssen | 526/301 |

FOREIGN PATENT DOCUMENTS 521489  5/1940  United Kingdom .

OTHER PUBLICATIONS

S. Hussain and N.N. Dass, Polymerization of Methyl Methacrylate by Charge Transfer Mechanism by Melamine and Iron (III) Complex, (1982), Eur. Polym. J. vol. 18. pp. 795–798.

Kiyoshi Royama and Masato Nishimura, Polymerization of Methyl Methacrylate by the Binary System of the Copper–Amine Complex Type Resin and Carbon Tetrachloride, (1972), Journal of Polymer Science: Part A–1, vol. 10, pp. 2601–2608.

S.D. Baruam and N.N Dass, Charge Transfer Initiation of Methylmethacrylate by Isopropylamine, (1980), European Polymer Journal, vol. 16, pp. 11–14.

Minoru Matsuda and Yasuhiro Ishioroshi, Polymerization Initiated by an Electron Donor–Acceptor Complex. Part IV. Kinetic Study of Polymerization of Methyl Methacrylate Initiated by the Charge–Transfer Complex Consisting of Poly–2–vinylpyridine and Liquid Sulfur Dioxide, (1969), Journal of Polymer Science: Part A–1, vol. 8, pp. 387–397.

S. Hussain and N.N. Dass, Polymerization of Methyl Methacrylate by a Charge Transfer Mechanism with Urea and Iron (III) Complex, (1982), Journal of Polymer Science: Polymer Chemistry Edition, vol. 20, pp. 3181–3187.

Hiroshi Narita, et al., Studies on the Polymerization of Vinyl Compounds in the Presence of Metal Salts, 13$^a$,(1978), Mak. Chem. vol. 179, pp. 1673–1679.

N.N. Dass and S.S. Begum, Effect of Ferric Cyanide Ions on the Polymerization of Methyl Methacrylate, (1982), Journal of Polymer Science: Polymer Letters Edition, vol. 20, pp. 297–303.

Polymerization of Methyl Methacrylate with Malononitrile and Fe(III) Mixture, (1985), Polymer Chemistry Edition, vol. 23, pp. 2561–2565.

P.K. Mahato et al., Mechanism of Acrylonitrile Polymerization Initiated by the Triphenyl Phosphine/Fe(III) Catalyst System, (1991), J. Polym. Mater. 8, pp. 133–137.

Noriyuki Kuramoto et al., Ferrocene as an Effective Initiator for Copolymerization of Styrene with Maleic Anhydride, (1995), Journal of Polymer Science: Part A: Polymer Chemistry , vol. 33, 967–971.

*Primary Examiner*—Christopher Henderson
*Attorney, Agent, or Firm*—Shlesinger Arkwright & Garvey LLP

[57] ABSTRACT

A process for the preparation of polymers having low molecular weight of the order of $10^4$ and with a low polydispersity index in the range of 1.2–1.7, said process comprising reacting an electron donor and an electron acceptor in a solvent medium at a temperature below the boiling point of the mixture under inert atmosphere, to form a complex which dissociates to release a free radical and a cation radical; preparing a solution of the desired monomer or monomers) and the free radical quencher in the same solvent used in step (i), under the same temperature; and adding the reaction mixture obtained in step (ii) to the mixture obtained in step (i) to form the polymer.

6 Claims, No Drawings

CHARGE TRANSFER POLYMERIZATION PROCESS FOR OBTAINING LOW MOLECULAR WEIGHT POLYMERS HAVING HIGH YIELDS

FIELD OF THE INVENTION

The present invention relates to a polymerization process for the preparation of polymers of low molecular weight. The polymer prepared by the process of the present invention may have the molecular weight of the order of $10^4$. This process particularly uses charge transfer polymerization mechanism employing free-radical quenchers as accelerators.

BACKGROUND OF THE INVENTION

Low molecular weight polymers with narrow poly dispersity index (1<1.7) find applications as additives in petroleum industry for pour point depression, viscosity improvement, and enhancement of antioxidant properties. These are commonly prepared by condensation, solution or charge transfer polymerizations.

Condensation Polymerization follows a step growth mechanism which involves the same basic reaction either between two monomeric units, between two end groups of different polymer chains, or between a monomeric group and end group of a polymer chain. However, the utility of this type of process is limited to monomers containing specific functional groups such as carboxylic and phenolic groups.

In solution polymerization process a solvent is used to dissolve the monomers, polymer and the initiators, and the solvent directly interacts with the growing chain to enable formation of low mocelular weight polymers. The main disadvantage of this process is that it should be conducted at relatively high temperatures (>70° C.) to be able to initiate the reaction. In charge transfer (CT) polymerization also a solvent is used to dissolve the monomers, polymer and the initiators. However, unlike in case of solution polmerization process, the initiation mechanism in CT polymerization takes place even at ambient temperatures($\leq$25° C.) through electron donor-acceptor interactions. Because of this distinct advantage CT polymerization route was chosen in the present case.

PRIOR ART RELATING TO THE PRESENT INVENTION

There has been an increasing interest in CT Polymerization process, especially for the preparation of homo and co-polymers of vinyl and acrylic monomers. For example, Hussian et al [Eur. polym. J. vol.18, pp 795–798, 1982] studied charge transfer polymerization of methylmethacrylate using melamine and carbon tetrachloride as electron donor—acceptor pair. Kiyoshi et al [Jr. of Polym. Sci., Part A-1, vol.10, 2601–2608, 1972] and Baruah et al [Eur. Polym. J vol.16, pp 11–14, 1980] have prepared the same polymer using copper amine complex resin and isopropylamine as electron donors. Matsuda et al[Jr.Polym.Sci. Part A-1, Vol.18, pp 387–397, 1970] studied polymerization of methylmethacrylate initiated by a charge transfer complex of poly-2-vinylpyridine(electron donor) and liquid $SO_2$ (acceptor) in the presence of carbon tetrachloride. However, in all the above mentioned studies, the polymer yields are typically about (5–12%) and molecular weight of the order of $10^{-5}$. Several attempts have been made by different researchers to improve the yields by employing catalysts/accelerators. For example Husain et al [Eur. Polym. Jr. Vol.18, pp 795–798, 1982 & Jr of Polym. Sci. Polym.Chem. Ed. Vol.20, 3181–3187, 1982] suggested $Fe^{3+}$ (Lewis acid), and urea, Narita et al [Makromolek. Chem, 179, pp 1673, 1978 ] suggested cuprous chloride, Dass et al [Jr of Polym. Sci. Polym. lett Ed., Vol.20, 297–303, 1982 & Jr of Polym-.Sci. Polym. Chem.Ed., Vol.23, 2561–2565, 1985] suggested Ferric cyannide ions and hexakisdimethylsulphoxideiron (III) perchlorate, Mahato et al [Jr of Polym. Material, Vol.8, 133–138, 1991] suggested triphenyl phosphine/$Fe^{3+}$, Kurmamoto et al [Jr of Polym. Sci. Part A, Polym. Chem. Vol.33, 967–971, 1995] suggested ferrocene as catalysts. Even when these cataylsts are employed the polymer yields do not exceed 30% in two hours reaction period.

SUMMARY OF THE INVENTION

The Process of the present invention is based on the finding that if the polymerization is affected employing a free radical quencher, not only the resulting polymer has low molecular weights but the yield is also improved.

OBJECTS OF THE INVENTION

The main objective of the present invention is to provide a charge transfer polymerization process for further enhancing the polymer yield to about 50%.

Another objective of the present invention is to provide a process to produce a polymer with low polydispersity index in the range of 1.3–1.7.

Yet another objective of the present invention is to provide an improved process for the preparation of low molecular weight polymers (of the order of $10^4$).

Still another objective of the present invention is to provide an improved process for producing polymers having low molecular weights with increased yields.

DETAILED DESCRIPTION OF THE INVENTION

The present process is based on the finding that if the polymerisation is carried out using a free radical quencher, not only the resulting polymer has low molecular weights but the yield is also increased. When the quencher is used in the reaction it absorbs the free radicals that are generated on dissociation of charge transfer complex, formed by the interaction of electron donor—acceptor molecules) which results in the increase in the concentration of cation radicals. The diminished activity of free radicals, which determine the chain growth is responsible for the lowering of molecular weight of the polymer formed while the increased activity of cation radicals contribute to the higher yields.

Accordingly the present invention relates to a process for the preparation of polymers having low molecular weight of the order of $10^4$, which comprises:

(i) reacting an electron donor and an electron acceptor in a solvent medium at a temperature below the boiling point of the mixture under inert atmosphere, to form a complex which dissociates to release a free radical and a cation radical;

(ii) preparing a solution of the desired monomer or monomers and the free radical quencher in the same solvent used in step (i), under the same temperature and inert atmosphere used in step (i);

(iii) adding the reaction mixture obtained in step (ii) to the mixture obtained in step (i) to form the polymer;

(iv) precipitating the polymer in a solvent formed in step (iii) by conventional methods;

(v) Separating the precipitated polymer by conventional methods; and (vi) Drying the polymer by conventional methods.

Preferably, the present process can be carried out by reacting isopropylamine or triethylamine or decylamine or n-butylamine (electron donor) and carbon tetrachloride (electron acceptor) in dimethyl sulphoxide (solvent medium) at 60° C. (temperature below the boiling point of the mixture) and in N (inert) atmosphere, to form a complex which dissociates to release a free radical and a cation radical; a solution of the methylmethacrylate or styrene-methylmethacrylate or styrene-ethylmethacrylate or styrene-butyl methacrylate (desired monomer or monomers) and hydroquinone or galvinoxyl or 1,4-benzoquinone or diphenyl picrylhydrazyl or 4-methoxy phenol (the free radical quencher) in the same solvent, temperature and inert atmosphere used in step (i); adding the reaction mixture obtained in step (ii) to the mixture obtained in step (i) to form the polymer; precipitating the polymer obtained in step (iii) by using methanol or ethylalcohol (non solvent); separating the precipitated polymer by conventional methods; and drying the polymer by any one of the known methods.

The solvent in steps (i) and (ii) should be able to dissolve the monomers as well as the polymer. As examples of the solvent dimethyl sulphoxide, dimethyl formamide, tetra hydrofuran may be mentioned. Similar solvents may also be employed. The electron donar such as n-butylamine, melamine, urea, diethylamine, triethylamine, trimethylamine, maleonitrile, ethanalamine, dinitro phenylhydrazine(DNPH), polyvinyl amine, isopropyl amine may be used.

The electron acceptor such as carbon tetrabromide, carbon tetra chloride, chloroform, methylene chloride, chloro benzene may be used. The quencher used should be capable of absorbing the free radicals and enhance the concentration of cation radicals. The quenchers such as 1,4-benzoquinone, galvinoxyl, diphenyl picryl hydrazyl, hydroquinone, 4-methoxy phenol may be used.

The monomer used may be selected from vinyl or acrylic monomer such as methylmethacrylate, styrene, ethylmethacrylate and butylmethacrylate. The precipate of the polymer formed may be separted by vacuum filtration.

The invention is described in detail in examples given below which are provided merely to illustrate the invention only. Therefore, these examples should not be constructed to limit the scope of the invention.

EXAMPLE I

In this process copolymerization of styrene and ethylmethacrylate (EMA) was conducted at 60° C. in dimethyl sulphoxide (DMSO) solvent using isopropyl amine and carbon tetrachloride as the initiator pair. 1,4 benzoquinone was employed as the free radical quencher.

The monomers were freed from inhibitors by washing with 5% sodium hydroxide solution followed by washing with excess water and finally distilled under vacuum. The initiators used were purified by distillation at atmospheric pressure. The solvent was purified by vacuum distilation. Analytical grade of the quencher was used without further purification. Polymerization was carried out in a two limbed H-shaped vessel. The first limb contained the pre determined amounts of quencher ($2\times10^{-3}$ moles/liter), and monomers (styrene=2.5 moles/liter; EMA=1.5 moles/liter)in the solvent while the second limb contained the initiators (isopropylamine=2.85 moles/liter; and carbon tetrachloride= 1.87 moles/liter) in the solvent. The vessel contents were placed under nitrogen atmosphere. The contents of the second limb were then transfered into those of the first limb and the vessel was thermostated at 60° C. The copolymerization was allowed to proceed for 2 hours. Then the copolymer was precipitated in an excess methanol, vacuum filtered, and vaccum dried at 30° C. Copolymer was weighed, and percentage yield calculated. The polymer was characterised by Gel Permeation Chromotography (GPC) for molecular weight distribution. The results are summarised in table 1.

EXAMPLE II

In this process homopolymerization of methylmethacrylate (MMA) was conducted at 60° C. in dimethyl sulphoxide (DMSO) solvent using triethylamine and carbon tetrachloride as the initiator pair. Galvinoxyl was employed as the free radical quencher.

The monomer (methylmethacrylate), was freed from inhibitors by washing with 5% sodium hydroxide solution followed by washing with excess of water and finally distilled under vacuum. The initiators used were purified by distillation at atmospheric pressure. The solvent was purified by vacuum distilation. Analytical grade of the quencher was used without further purification. Polymerization was carried out in a two limbed H-shaped vessel. The first limb contained the pre determined amounts of quencher($2.5\times10^{-4}$ moles/liter,) and monomer (methylmethacrylate=3 moles/ liter) in the solvent while the second limb contained the initiators (triethylamine=0.5 moles/liter; and carbon tetrachloride=1.82 moles/liter) in the solvent. The vessel contents were placed under nitrogen atmosphere. The contents of the second limb were then transfered into those of the first limb and the vessel was thermostated at 60° C. The homo polymerization was allowed to proceed for 2 hours. Then the homopolymer was precipitated in excess methanol, vacuum filtered, and vaccum dried at 30° C. Homopolymer was weighed, and pecentage yield calculated. The polymer was characterised by Gel Permeation Chromotography for molecular weight distribution. The results are summarised in table 1.

EXAMPLE III

In this process copolymerization of styrene was conducted at 60° C. in dimethyl sulphoxide (DMSO) solvent using decylamine and carbontetrachloride as the initiator pair. Diphenylpicrylhydrazyl (DPPH) was employed as the free radical quencher.

The monomers (styrene-butylmethacrylate), were freed from inhibitors by washing with 5% sodium hydroxide solution followed by washing with excess water and finally distilled under vacuum. The initiators used were purified by distillation at atmospheric pressure. The solvent was purified by vacuum distilation. Analytical grade of the quencher was used without further purification. Polymerization was carried out in a two limbed H-shaped vessel. The first limb contained the pre determined amounts of quencher ($1.2\times10^{-4}$ moles/liter,) monomers (styrene=2 moles/liter and butylmethacrylate=2 moles/liter in the solvent while the second limb contained the initiators (decylamine=1.82 moles/liter; and Carbon tetrachloride=1.87 moles/liter) in the solvent. The vessel contents were placed under nitrogen atmosphere. The contents of the second limb were then transfered into those of the first limb and the vessel was thermostated at 60° C. The copolymerization was allowed to proceed for 2 hours. Then the copolymer was precipitated in an excess methanol, vacuum filtered, and vaccum dried at 30° C. Copolymer was weighed, and percentage yield calculated. The polymer was characterised by Gel Permeation Chromotography for molecular weight distribution.

The results are summarised in table 1.

EXAMPLE IV

In this process copolymerization of styrene and methylmethacrylate was conducted at 60° C. in dimethyl sulphoxide (DMSO) solvent using n-butylamine and carbon tetrachloride as the initiator pair. Hydroquinone was employed as the free radical quencher.

The monomers (styrene and methylmethacrylate), were freed from inhibitors by washing with 5% sodium hydroxide solution followed by washing with excess water and finally distilled under vacuum. The initiators used were purified by distillation at atmospheric pressure. The solvent was purified by vacuum distilation. Analytical grade of the quencher was used without further purification. Polymerization was carried out in a two limbed H-shaped vessel. The first limb contained the pre determined amounts of quencher ($2.75 \times 10^{-3}$ moles/liter), and monomers (styrene=0.5 mole/liter and methylmethacrylate=3.5 moles/liter) in the solvent while the second limb contained the initiators (n-butylamine=0.75 moles/liter; and Carbontetrachloride=1.87 moles/liter) in the solvent. The vessel contents were placed under nitrogen atmosphere. The contents of the second limb were then transfered into those of the first limb and the vessel was thermostated at 60° C. The homopolymerization was allowed to proceed for 2 hours. Then the copolymer was precipitated in excess methanol, vacuum filtered, and vaccum dried at 30° C. copolymer was weighed, and percentage yield calculated. The polymer was characterised by gel permeation chromatography for molecular weight distribution. The results are summarised in table 1.

EXAMPLE V

In this process homopolymerization of methylmethacrylate was conducted at 60° C. in dimethyl sulphoxide (DMSO) solvent using n-butylamine and carbon tetrachloride as the initiator pair. 4-methoxyphenol was employed as the free radical quencher.

The monomer (methylmethacrylate), were freed from inhibitors by washing with 5% sodium hydroxide solution followed by washing with excess water and finally distilled under vacuum. The initiators used were purified by distillation at atmospheric pressure. The solvent was purified by vacuum distilation. Analytical grade of the quencher was used without further purification.Analytical grade of the quencher was used without further purification. Polymerization was carried out in a two limbed H-shaped vessel. The first limb contained the pre determined amounts of quencher ($2 \times 10^{-3}$ moles/liter), and monomer (methylmethacrylate=2 moles/liter in the solvent while the second limb contained the initiators (n-butylamine=1.2 moles/liter; and carbontetrachloride=1.87 moles/liter) in the solvent. The vessel contents were placed under nitrogen atmosphere. The contents of the second limb were then transfered into those of the first limb and the vessel was thermostated at 60° C. The homopolymerization was allowed to proceed for 2 hours. Then the homopolymer was precipitated in excess methanol, vacuum filtered, and vaccum dried at 30° C. Homopolymer was weighed, and pecentage yield calculated. The polymer was characterised by gel permeation chromatography. The results are summarised in table 1.

TABLE 1

RESULTS OF CHARGE TRANSFER INITIATED POLYMERIZATION SYSTEM INVOLVING FREE RADICAL QUENCHERS

| Example | % Yield | $M_n \times 10^4$ | $M_w \times 10^4$ | $M_w/M_n$ |
|---|---|---|---|---|
| 1 | 38.5 | 1.6 | 2.7 | 1.67 |
| 2 | 44.1 | 0.6 | 0.7 | 1.17 |
| 3 | 46.3 | 1.0 | 1.4 | 1.43 |
| 4 | 62.35 | 0.8 | 1.0 | 1.23 |
| 5 | 32.40 | 1.0 | 1.4 | 1.32 |

The results of Table 1 clearly show the use of free radical quenchers in the process developed by the invention results in higher yields (30–60%), with a polydispersity index of 1.2–1.7 and molecular weight in the order of $10^4$.

The results shown in the below mentioned table 2 correspond to copolymerisation of sty-EMA, homopolymerisation of MMA and sty. These experiments were carried out at 30° C. by adopting the same procedures outlined in the five examples of Table 1. The objective of presenting these results is to show that even at temperatures>30° C. polymerisation can be initiated by CT mechanism and enhancement of yields achieved by using radical quenchers.

TABLE 2

| S.NO. | % Yield | $M_n \times 10^4$ | $M_w \times 10^4$ | $M_w/M_n$ |
|---|---|---|---|---|
| 1 | 15.3 | 2.1 | 3.2 | 1.52 |
| 2 | 12.5 | 2.6 | 3.8 | 1.65 |
| 3 | 10.7 | 2.8 | 3.9 | 1.82 |

We claim:

1. A process for preparing polymers having low molecular weight of the order of about $10^4$ and a polydispersity index in the range of about 1.2 to about 1.7, the process comprising the steps of:

(a) reacting an electron donor and an electron acceptor in a solvent medium at a temperature below the boiling point of the mixture and in an inert atmosphere, to form a complex which dissociates to release a free radical and a cation radical wherein the electron donor is selected from the group consisting of n-butylamine, melamine, diethylamine, triethylamine, trimethylamine, meleonitrile, ethanolamine, dinitrophenylhydrazine (DNPH) and isopropylamine;

(b) preparing a reaction mixture comprising a solution of at least one monomer or monomers and a free radical quencher, the reaction mixture containing a solvent of the type selected in step (a) and having a temperature and inert atmosphere of the type selected step (a);

(c) adding to the reaction mixture obtained in step (b) the mixture obtained in step (a) to form a polymer;

(d) precipitating the polymer in a solvent;

(e) separating the precipitated polymer; and (f) drying the separated polymer.

2. A process as claimed in claim 1, wherein the solvent used in steps (i) and (ii) is selected from the group consisting of dimethyl sulphoxide, dimethyl formamide and tetra hydrofuran.

3. A process as claimed in claim 1, wherein the electron acceptor is selected from the group consisting of carbontetrachloride, carbontetrabromide, chloroform, methylene chloride, and chlorobenzene.

4. A process as claimed in claim 1 wherein the free radical quencher is selected from the group consisting of 1,4-benzoquinone, galvinoxyl, diphenypicrylhydrizyl hydroquinone and 4-methoxy phenol.

5. A process as claimed in claim 1 wherein at least one monomer or monomer(s) used in step (b) is selected from the group consisting of methylmethacrylate, styrene, butylmethacrylate and ethylmethacrylate.

6. A process as claimed in claim 1 wherein the precipitate formed is separated by vacuum filtration.

* * * * *